(12) United States Patent
Hernandez-Mondragon

(10) Patent No.: US 11,441,773 B2
(45) Date of Patent: Sep. 13, 2022

(54) SYSTEMS AND METHODS FOR IMPROVED BIOHAZARD WASTE DESTRUCTION

(71) Applicant: Edwin Alcides Hernandez-Mondragon, Coral Springs, FL (US)

(72) Inventor: Edwin Alcides Hernandez-Mondragon, Coral Springs, FL (US)

( * ) Notice: Subject to any disclaimer, the term of this patent is extended or adjusted under 35 U.S.C. 154(b) by 0 days.

(21) Appl. No.: 16/578,098

(22) Filed: Sep. 20, 2019

(65) Prior Publication Data

US 2020/0096194 A1    Mar. 26, 2020

Related U.S. Application Data

(60) Provisional application No. 62/920,590, filed on Sep. 20, 2018.

(51) Int. Cl.
*F23G 5/50* (2006.01)
*G06K 19/02* (2006.01)

(52) U.S. Cl.
CPC ............ *F23G 5/50* (2013.01); *G06K 19/025* (2013.01); *F23G 2207/101* (2013.01); *F23G 2207/104* (2013.01); *F23G 2209/20* (2013.01)

(58) Field of Classification Search
CPC ....................................................... F23G 5/50
See application file for complete search history.

(56) References Cited

U.S. PATENT DOCUMENTS

| 5,956,019 A | 9/1999 | Bang et al. |
| 5,972,291 A | 10/1999 | Healy et al. |
| 7,119,689 B2 | 10/2006 | Mallett et al. |
| 7,318,529 B2 | 1/2008 | Mallett et al. |
| 10,394,256 B2 * | 8/2019 | Jones ............... G05B 19/41855 |

(Continued)

FOREIGN PATENT DOCUMENTS

| CN | 1237685 A | 12/1999 |
| DE | 3911971 A1 | 10/1990 |
| WO | 2017/140243 | 8/2017 |

OTHER PUBLICATIONS

"Radiators and heaters in Augmented Reality", AR Visual, Aug. 26, 2019.

(Continued)

*Primary Examiner* — Nathaniel Herzfeld
(74) *Attorney, Agent, or Firm* — Gregory L. Mayback; Dickinson Wright PLLC

(57) ABSTRACT

Systems and methods that comprise scanning, using a camera on a mobile electronic device, a target item coupled to a heating device. The heating device comprises: a transceiver that receives commands for controlling operations of the heating device to dispose of biohazard waste; and a target item that is coupled to or presented by the heating device, and includes heating device identification data. The methods also comprise: obtaining, using a mobile communication device including a circuit, the heating device identification data from the target item; accessing the heating device using the heating device identification data; and causing a graphical user interface to be presented that enables user-software interactions for communicating the commands from the mobile communication device to the heating device.

20 Claims, 14 Drawing Sheets

(56) References Cited

U.S. PATENT DOCUMENTS

| | | | |
|---|---|---|---|
| 2010/0096463 A1* | 4/2010 | Perera | G06K 7/0004 |
| | | | 235/470 |
| 2015/0067819 A1* | 3/2015 | Shribman | H04L 67/32 |
| | | | 726/12 |
| 2015/0205985 A1 | 7/2015 | Jinadatha | |
| 2016/0050695 A1* | 2/2016 | Bichot | H04W 4/80 |
| | | | 455/41.2 |
| 2016/0348007 A1 | 12/2016 | Qiu | |
| 2017/0364872 A1* | 12/2017 | Rodoni | G06Q 10/06315 |
| 2018/0032125 A1* | 2/2018 | Peterson | G06F 3/013 |
| 2019/0066239 A1* | 2/2019 | Touchette | G06F 3/011 |
| 2019/0174769 A1* | 6/2019 | Dingman | G06F 3/011 |

OTHER PUBLICATIONS

Liao, "Whirlpool's smart oven uses AR to assist your baking", The Verge, Jan. 8, 2019.
"Augmented Reality Instrumentation Provides Virtual View Inside Industrial Furnaces", Process Heating., Apr. 10, 2019.
"Augmented Reality in the HVAC industry", AR Visual, Jun. 14, 2019.
Strand, "Baker Furnace Introduces Augmented Reality Platform for use on Furnace Lines", Baker Furnace, Mar. 22, 2019.
International Search Report and Written Opinion dated Dec. 11, 2019 in PCT/US19/52276.

* cited by examiner

SYSTEMS AND METHODS FOR IMPROVED BIOHAZARD WASTE DESTRUCTION

CROSS REFERENCE TO RELATED APPLICATIONS

This application claims priority to U.S. Provisional Patent Application No. 62/920,590 filed on Sep. 20, 2018, entitled, "System, Method and Apparatus For Virtualized Operations for Biohazard Disposal", the disclosure of which is hereby incorporated by reference in its entirety.

TECHNICAL FIELD

The present disclosure relates, in general, to software provisioning, control, and heating/melting process of waste at high-temperature to safely dispose of biohazard materials or other products processed by a heating device.

BACKGROUND

High-temperature controlled processes present challenges, due to the heat generated during these processes, in controlling the systems and machinery associated with these processes. Previously, embedded computers were used to handle any high-temperature controlled processes.

In one such example, an embedded computer is tied to a set of thermos couplers, a solenoid actuator, a display with a Liquid Crystal Display ("LCD") screen, a serial printer, and some other devices with limited and closed environments for controlling an incineration process at 400 degrees Fahrenheit and maintaining a safe environment for the operator.

In another example, a system controls the process of destroying special waste through a chamber and a waste box with a PIN code. This system uses this code for authentication and authorization which is combined in a software platform that inserts an identity card into a system for purposes of validating a user to use a device to initiate the destruction of hazardous materials. In a similar configuration, other systems, include a method and set of instructions to sort pharmaceutical waste that is loaded into a device with ties to an array of electromechanical sensors and a computer for automation in the destruction of waste.

Generally, other systems for incineration have been created including touch-based screen and user-friendly processes. Touch-based systems are in use in many other fields besides biohazard waste disposal and incineration.

SUMMARY

The present disclosure concerns implementing systems and methods. The methods comprise scanning, using a camera on a mobile electronic device, a target item (e.g., a barcode or RF tag) coupled to a heating device (e.g., an incineration device or a melting device). The heating device comprises: a transceiver that receives commands for controlling operations of the heating device to dispose of biohazard waste; and a target item that is coupled to or presented by the heating device, and includes heating device identification data. The methods also comprise: obtaining, using a mobile communication device including a circuit, the heating device identification data from the target item; accessing the heating device using the heating device identification data; and causing a graphical user interface to be presented that enables user-software interactions for communicating the commands from the mobile communication device to the heating device.

In some scenarios, the methods further comprise: causing a computer-generated image of the heating device to be superimposed on a user's view of a real world environment; and/or generating sensor data, using the at least one sensor, that is useful for identifying at least one biohazard waste material within the heating device.

The heating device may also comprises at least one sensor configured to further comprise taking one or more measurements using the at least one sensor. The measurements include, but are not limited to, an internal temperature of the heating device, a temperature of a biohazard waste material within the heating device, a weight of a biohazard waste material within the heating device, a volume of a biohazard waste material within the heating device, a level of carbon dioxide within the heating device, a level of water within the heating device, and/or an amount of time since a start of a heating process being performed by the heating device.

In those or other scenarios, the mobile communication device comprises a microphone. Commands may be generated for controlling operations of the heating device in accordance with voice commands input using the microphone. The operations of the heating device include, but are not limited to, powering on the heating device, powering off the heating device, altering a temperature of the heating device, and/or setting a timer for a function of the heating device.

The methods may also comprise: using the mobile communication device; accessing management data generating by one or more sensors of the heating device; and facilitating a visual inspection of the heating device in an augmented reality environment. The heating device may additionally or alternatively be wirelessly coupled to the mobile communications device via a cloud network. The wirelessly coupling includes inputting one or more login credentials.

The present document also concerns implementing systems. The systems comprise a heating device and a mobile communication device. The heating device comprises: a transceiver that receives commands for controlling operations of the heating device to dispose of biohazard waste; a target item that is coupled to or presented by the heating device, and includes heating device identification data; and/or at least one sensor configuration to take certain measurements. The mobile communication device comprises a circuit configured to: obtain the heating device identification data from the target item; access the heating device using the heating device identification data; and cause an augmented reality user interface to be presented that enables user-software interactions for communicating the commands from the mobile communication device to the heating device.

In some scenarios, the circuit is further configured to: cause a computer-generated image of the heating device to be superimposed on a user's view of an augmented realty environment.

In those or other scenarios, the measurement(s) made by the sensor(s) include, but are not limited to, an internal temperature of the heating device, a temperature of a biohazard waste material within the heating device, a weight of a biohazard waste material within the heating device, a volume of a biohazard waste material within the heating device, a level of carbon dioxide within the heating device, a level of water within the heating device, and an amount of time since a start of a heating process being performed by the heating device. The sensor may also generate sensor data that is useful for identifying at least one biohazard waste material within the heating device.

The mobile communication device may also comprises a microphone. The processor may also generate commands for controlling operations of the heating device in accordance with voice commands input using the microphone. The mobile communication device may further access measurement data generated by one or more sensors of the heating device, and facilitate a visual inspection of the heating device in an augmented reality environment.

BRIEF DESCRIPTION OF THE DRAWINGS

The present solution will be described with reference to the following drawing figures, in which like numerals represent like items throughout the figures.

DETAILED DESCRIPTION

Figure 1:
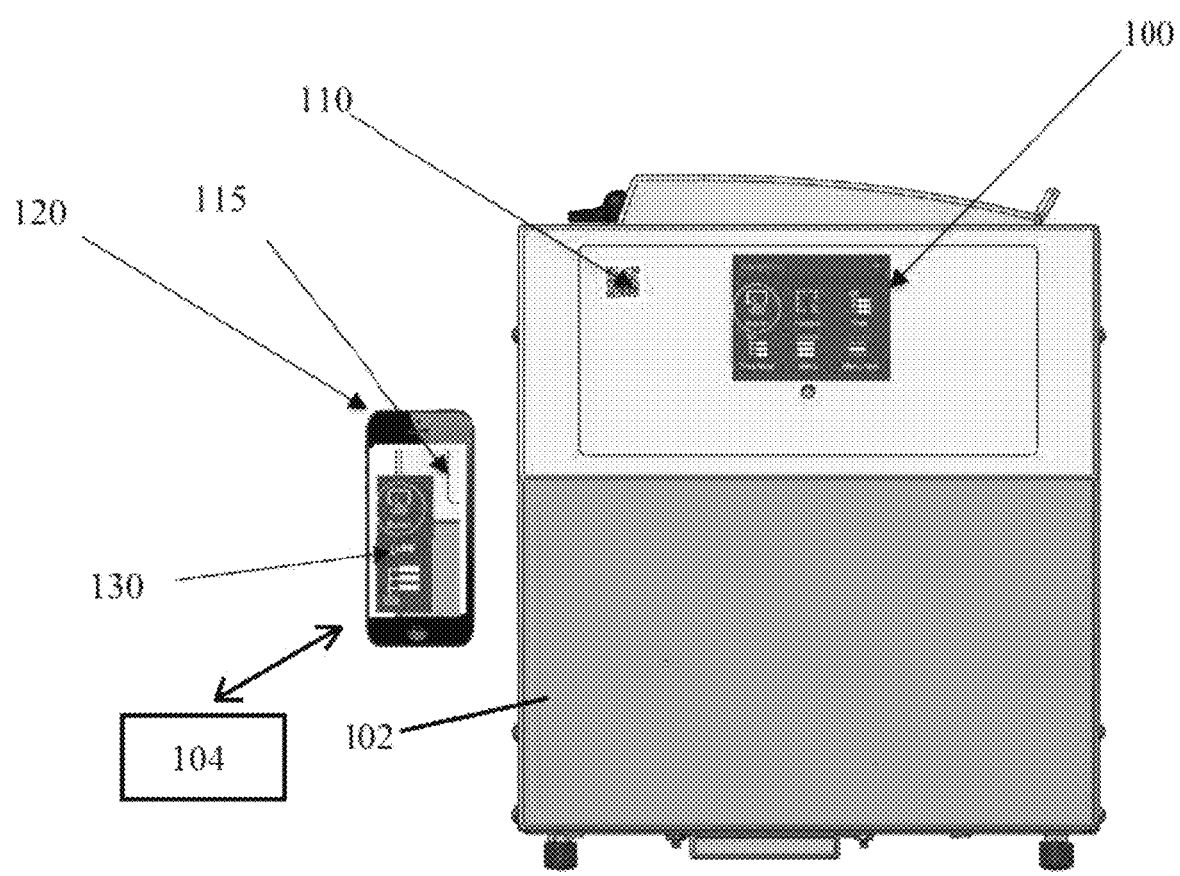
FIG. 1 provides a system diagram illustrating a touch screen interface to an incineration process.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some scenarios, the term "approximately" may include values that are within +/−10 percent of the value.

The terms "memory," "memory device," "data store," "data storage facility" and the like each refer to a non-transitory device on which computer-readable data, programming instructions (e.g., instructions 302 of FIG. 3) or both are stored. Except where specifically stated otherwise, the terms "memory," "memory device," "data store," "data storage facility" and the like are intended to include single device implementations, implementations in which multiple memory devices together or collectively store a set of data or instructions, as well as individual sectors within such devices.

The present solution employs touch-based user interfaces, provisioning, and Augmented Reality ("AR") to manage and control the processes of incineration that are used in the destruction of biohazard materials. The touch-based user interfaces may include various forms of Graphical User Interfaces ("GUIs"). According to various scenarios, the GUI includes an AR user interface. The present solution provides an improvement to present melting and/or incinerator systems that include a thermos coupler unit used for temperature measurement, a heating mechanism with a resistor to heat a crucible of certain size or volume, and a latching/locking mechanism to seal the door of the incineration or melting processes. The present solution may be used to control any melting process derived from heat, and/or any other incineration system or apparatus that is designed to destroy biohazard material, toxic waste, and/or any other melting or incineration process with air filtering, a condensation process, and any other component or sensor required for a safe melting/heating mechanism.

For high-temperature controlled incineration processes, in general, a container (such as a crucible or other suitable form of container) may typically be used to hold materials to be destroyed inside a heat chamber or containment unit configured to house the crucible. The heating element may include one or more sensors configured to detect a temperature of the crucible, a temperature of one or more materials within the crucible, a weight and/or mass of the one or more materials within the crucible, a volume of the one or more materials within the crucible, a level of carbon dioxide within the containment unit, a level of water within the containment unit, and/or any other characteristic/feature of the crucible, materials, containment unit. Additionally or alternatively, the sensors may generate sensor data that is useful for identifying one or more of the materials within the crucible.

During operation, the heating element applies a high temperature to the container containing the materials to be incinerated. The container is able to withstand incineration temperatures (typically around 400° F. or higher). The container will not melt or burn by exposure to the high heat, and all load and contents inside the container are melted and/or destroyed. Generally, the heat kills any bacteria and viruses, melts many metals and plastics, and/or neutralizes any biohazard materials inside the container through incineration. The process provides a safe means of waste disposal.

Figure 10:
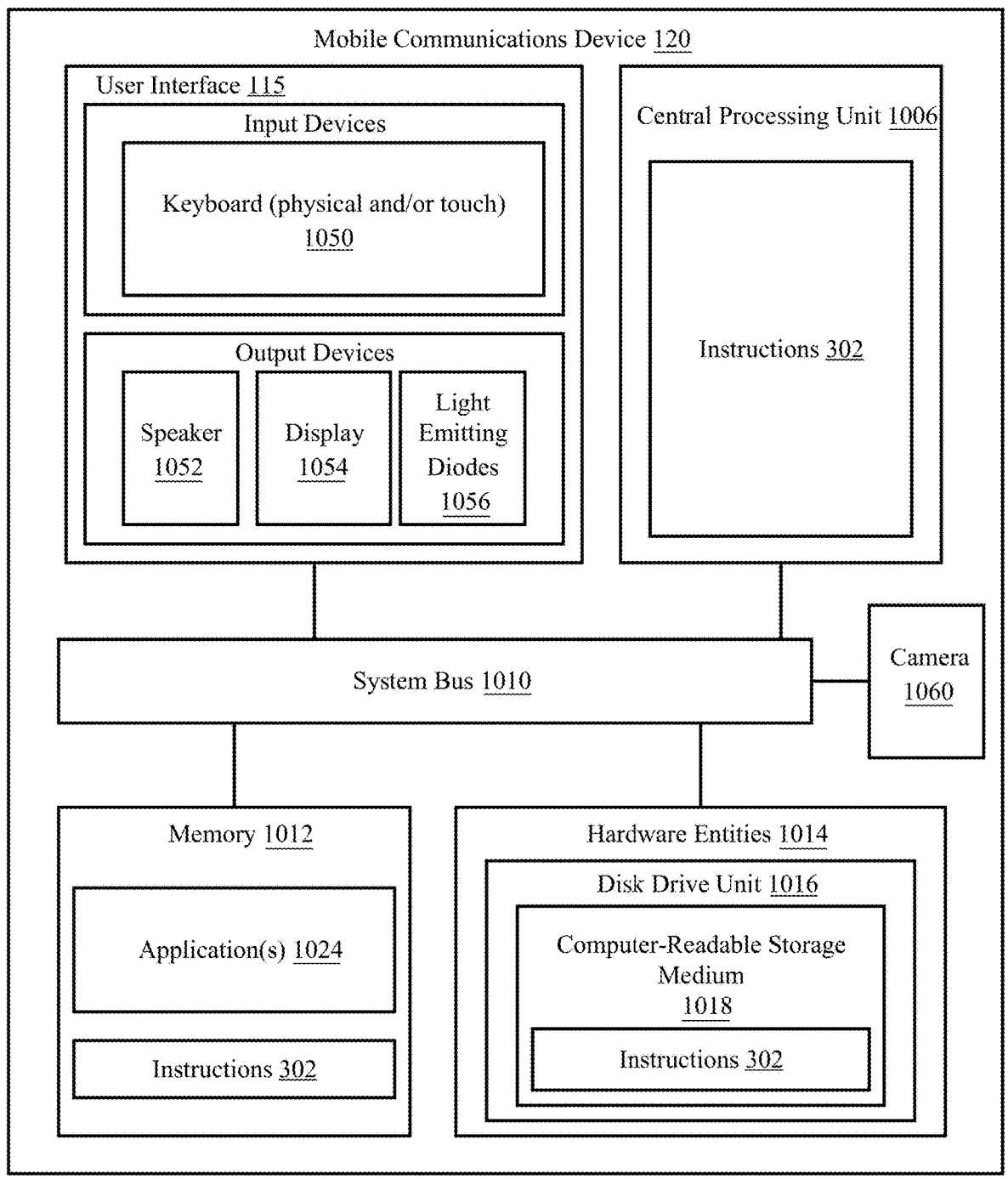
FIG. 10 provides an illustration of an illustrative architecture of a mobile communication device.

Referring now to FIG. 1, an illustration is provided that shows mobile communication device 120 and a heating device 102. The mobile communication device 120 is displaying a User Interface ("UI") 115 on a touch screen such as, but not limited to, a GUI, an AR UI, and/or any other suitable UI. The mobile communication device 120 may include, but is not limited to, a mobile phone, Personal Digital Assistant ("PDA"), personal computer, and/or tablet. Accordingly, the mobile communication device 120 (as shown in FIG. 10) comprises a processor 1006 (e.g., a Central Processing Unit ("CPU") and a memory 1012 (including one or more software applications 1024 and programming instructions 302). The mobile communication device 120 further includes a user interface 115, which may include one or more input devices 1050 such as, but not limited to, a keyboard (physical and/or touch), and one or more output devices such as, but not limited to, a speaker 1052, a display 1054, and one or more light emitting diodes 1056. The processor 1006 is configured to cause the mobile communication device 120 to perform one or more functions of the present solution as described herein. The processor 1006 may be configured to run one or more programming instructions 302. The mobile communication device 120 may further include one or more cameras 1060 and one or more hardware entities 1014, such as a disk drive unit 1014, which may include a computer-readable storage unit 1018 and one or more programming instructions 302. One or more of the components of the mobile communication device 120 may be coupled via a system bus 1010.

Some or all of the components of the mobile communication device 120 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

The heating device 102 may include, but is not limited to, an incinerator device and/or a melting device. In the incineration device scenarios, the heating device 102 comprises an incineration unit containing the crucible and a display 100 (e.g., an LCD screen). According to other scenarios, a cooling device may be used in addition to, or alternatively from, the heating device 102.

The mobile communication device 120 may use any standard image capture mode. The User Interface (UI) 115 being presented by the mobile communication device depicts the use of an AR kit mode. The images received by the mobile communication device's camera are captured from the incinerator or biohazard disposal device, which is shown on the screen 115.

In some scenarios, the mobile communication device 120 is configured to run an Augmented Reality (AR) application configured to overlay a touchable menu 130 that can be used to control the melting or incineration device and biohazard disposal process (e.g. an AR Kit for a smart phone device, mobile communication device, etc.). The heating device 102 and the mobile communication device 120 include one or more transceivers configured to facilitate communications therebetween. These communications allow the mobile communication device 120 to monitor and/or control operations of the heating device 102. These operations can include, but are not limited to, management operations (e.g., powering on the heating device, powering off the heating device, altering a temperature of the heating device, etc.) and/or monitoring operations (e.g., accessing data measurements taken from one of more sensors of the heating device, visually inspecting one or more components of the heating device, etc.).

A target item may be disposed on an exterior surface of the heating device 102 and/or presented within the display 100 of the heating device 102. The target item may include, but is not limited to, a Quick Response ("QR") code, a barcode, a Radio Frequency Identification ("RFID") tag, identification data, and/or any other suitable item that is useful for identifying the heating device 102. The target item may comprise an identifier for the heating device 102 that is being used.

During operation, the identifier of the target item, including any identification data, is obtained by the mobile communication device 120 (e.g., via a camera, barcode reader and/or tag reader). The identifier is communicated from the mobile communication device 120 to a remote management system 104 (e.g., a cloud based system). This communication is performed to notify the remote management system that the given heating device 102 is being used, is going to be in use, and/or needs to be in use.

In response to the notification, the remote management system 104 performs operations to determine whether the heating device 102 is communicatively coupled to the remote management system 104. If the heating device 102 is disconnected from the remote management system 104, then the heating device 102 operates in manual mode and stores information locally until the heating device 102 is back online. When online, the heating device 102 provides remote management system 104 with a log of the operations performed during the period of time when the heating device 102 was offline. However, a usage policy could be imposed by which no action can be performed with the heating device 102 when the device is found to be in a disconnected state (i.e., disconnected from the remote management system 104).

The target item may further include access information for the heating device 102. This access information is then used by the mobile communication device 120 and/or remote management system 104 to obtain access to the heating device 102 for monitoring, managing and/or controlling the same.

Other contextual data may be used to determine the identity of the heating device 102. For example, Bluetooth Media Access Control ("MAC") Addresses and/or broadcasting Service Set Identifiers ("SSIDs") may additionally or alternatively be used to identify the heating device 102 (e.g., via Radio Frequency (RF) Fingerprinting and/or any other suitable means of identifying the heating device 102). A mapping may be made to the heating device 102 either by identifying the picture with the target item and/or by using the heating device 102 on a screen and detecting edges, and other procedures that are either computed internally or externally in a cloud-based or rest service available for this purpose.

As the heating device 102 is identified by its context, and/or by any other suitable method, a standard login/password may be presented to the user to validate in the remote management system 104 that such user has permissions to control the heating device 102. The UI may be floating and will appear in the proximity of the camera that is pointing to the heating device 102, as shown in 130, where a menu associated to the heating device 102 is then presented, and overlaid into video that the mobile communication device's display.

Figure 2A:
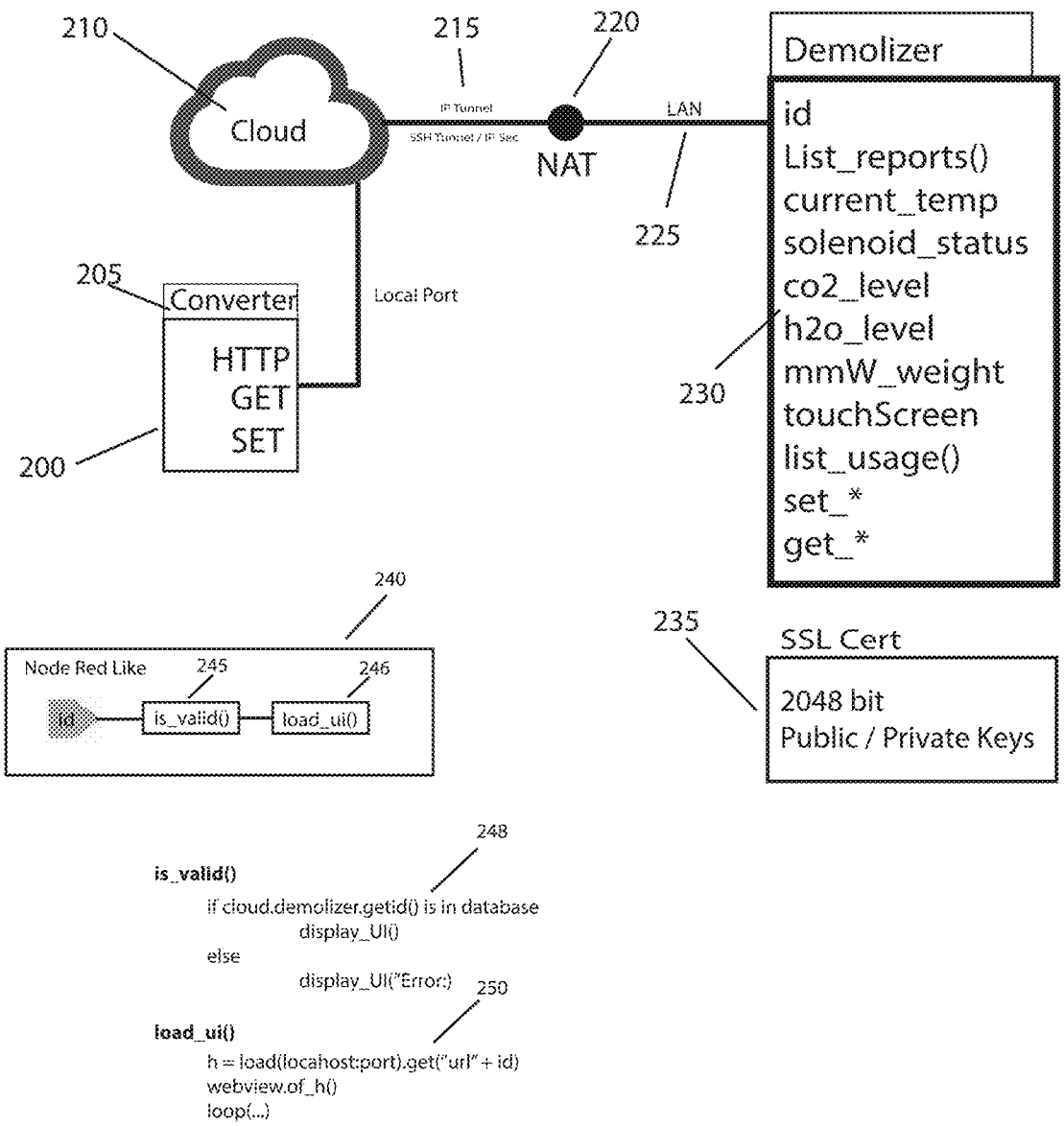
FIG. 2A provides an illustration of an illustrative architecture, data definition language, and objects.
Figure 2B:
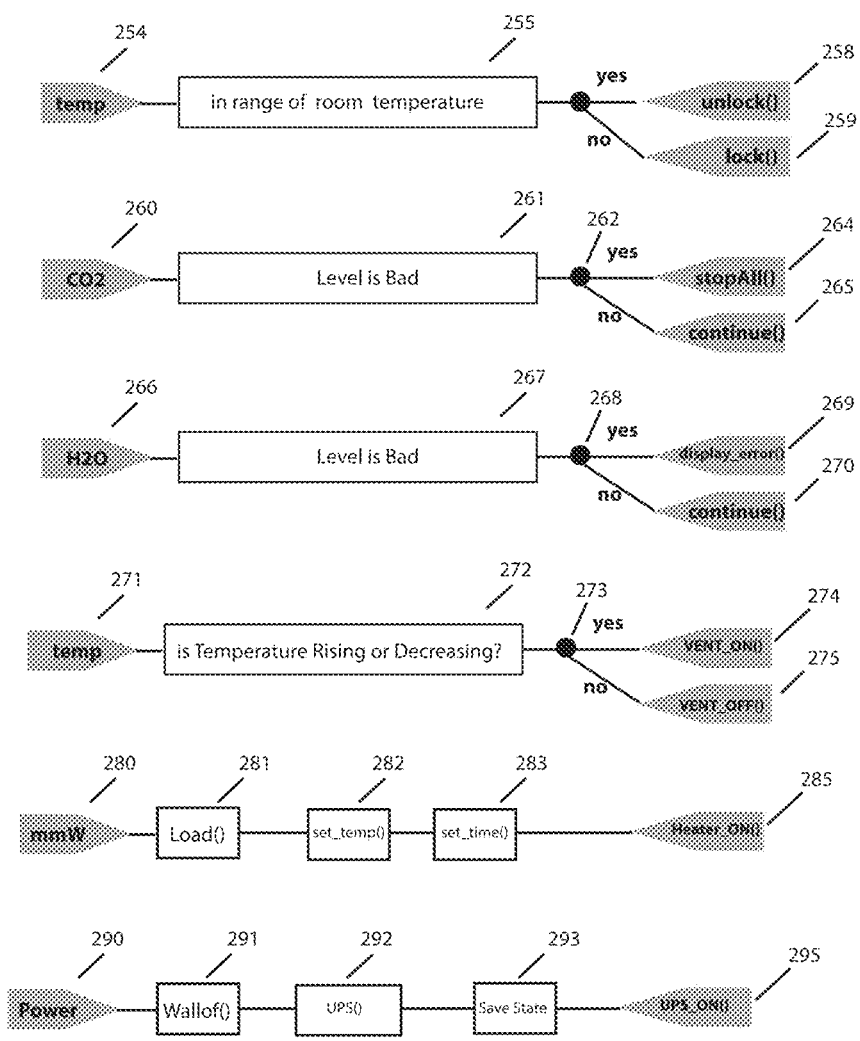
FIG. 2B provides a flow diagram of an illustrative method and abstraction process to create a Javascript object on a graphical syntax.

In order to control, manage, and properly control the melting and/or incineration processes inside the heating device 102, a novel architecture is presented in FIGS. 2A-2B (collectively referred to herein as "FIG. 2").

In accordance with the architecture, the heating device 102 becomes part of the "Internet of Things," exposing a novel way to measure and control temperature, control and manage heating and/or melting processes, detect biohazard materials, measure volume and weight, and collect information and data that enables the use of big data analysis and/or any other statistical method or methods to establish correlation or machine learning methods in any melting and/or heating device.

The system shown in FIG. 2A uses a heating device comprising a demolizer 230. The structure of the demolizer 230 is implemented as an object or a class (e.g., C++, Java, etc.) and is defined using a Data Definition Language ("DDL"). The DDL presents a set of properties that could be stored locally in the demolizer 230 such as "id", "List_report[ ]", and all other commands. As an example, "List_report[ ]" can be represented as an array or a list of reports.

Another property, shown in FIG. 2A, is that the current temperature ("current_temp") holds the value of the current temperature value in degrees Fahrenheit or degrees Celsius. This temperature could also be stored in a list or array of timestamp values and temperatures. The structure could be separated to signal temperature values at the heater device, the crucible, the exterior parts of the demolizer 230, or any other temperature that is required to control and manage the melting/heating process.

It is assumed that a door or latch will protect the heating process and, as a consequence, a solenoid element would be required to maintain the latch or door closed while the melting process is in place and open it when it is completed. Hence, the variable "solenoid_status" is required to determine if the latching door mechanism is on or off. Another parameter that is important to track and sense is the value of Carbon Dioxide ("$CO_2$"). As this element is produced when burring or melting plastics or other materials, and, although the device may contain filters that protect and block this dangerous gas, it is required to sense and compute value and ensure any melting process is safe to humans.

Additionally, as a residual component of any melting and heating process, gas and water is released. The water element is also measured by the sensors in the demolizer 230. The h2O_level measures the amount of water ("$H_2O$") stored in the condenser module of the demolizer 230. A condenser is used during the melting process and is connected to a water container that is stored while the heaters are turned on.

As presented in FIG. 1, as the heating device 102 is in use by several technicians or users, all touch screen interactions, voice commands, and other inputs are also stored. The tracking and status of all utilization is stored in a variable similar through "touch_screen" array. An array or list is the proper structure that will store a set of elements stored in the variable "list_usage[ ]" or this could be stored in a database such as "Mongo DB" or even "MySQL."

The "mmW weight" that includes the Multi-millimeter Wave ("mmW") sensor determines the amount of material in the crucible. By using multi-millimeter waves at ultra-high frequencies, the sensor detects by one or several mmW sensors. The weight can be estimated by the density of the materials reflected by the mmW sensor. The volume of biohazard materials placed within the crucible and that will be melted can be tracked using the mmW sensor as this sensor can be placed within the crucible and determine how "empty" or "full" the crucible is. The computation and signal analysis of the amount of materials is required to determine melting time and potential temperature to use at the crucible.

Additionally, FIG. 2A depicts how many properties can be set or configured as well as retrieved or get by virtue of get_* or set_* functions, which are stored in the demolizer 230. These functions can be implemented as part of the Uniform Resource Locator ("URL") and port to retrieve or change the values within the heating device. The demolizer 230 could be an object class as in Java, C++, and/or any other language that maps requests to parameters or properties that include sensors, configuration parameters, heater elements, solenoid controllers, and others.

The network connectivity between the melting device and the cloud 210 is established in such a way that a converter module 205 or converter application layer unit will handle Hyper Text Transfer Protocol ("HTTP") GET requests, HTTP POST requests, HTTP HEAD requests and/or set/get commands 200 for all the parameters stored in the demolizer structure. This is how the network to structure mapping is configured.

The mechanism presented in the present disclosure uses an SSH Reverse IP (Internet Protocol) tunnel 215 and a Secured Socket Layer ("SSL") certificate 235 for mapping a local port 230 in the cloud environment to a tunnel that can traverse any network including Network Address Translation ("NAT") systems 220 and access the Local Area Network ("LAN") 225 environment where the heating device has obtained a private Internet Protocol ("IP") address.

What this software architecture and method depicts is, as an example, a command called "get_all_values( )" created within the heating device. This function call is exposed via HTTP via, e.g., the URL <http://localhost:8080/get_all_values>.

Any command value is mapped to any function. For example, "start a heater component in the crucible." The command "startHeater" or any other command can be then mapped to <http://127.0.0.1:8000/startHeater/>. Hence, any mobile communication device application can retrieve all of the parameters in the class by contacting the local TCP/UDP port associated with the tunnel that has been assigned to the heating device.

For example, a network node may be under the name server.domain.com. This network code is mapped to the public IP address where the heating device can be contacted in a cloud environment 210 and the TCP port 8080 is assigned to be used to redirect all traffic to the LAN 225 where the heating device is located remotely at a doctor's office. By establishing the IP tunnel 215, all requests directed to the TCP port 8080 are sent directly to the heating device in the remote LAN. Hence, using a standard HTTP (S) request into server.domain.com:8080/get_all_values, a request traverses through the secured tunnel all the way to the melting and/or incineration (e.g., an object or class retrieving all values stored in the remote device). The result from an HTTP request could be formatted using Java Script Object Notation ("JSON") as shown in the following TABLE 1.

TABLE 1

```
HTTP/1.1 200 OK
Content-Type: application/vnd.api+json
\{ "data": [
    { "id": "$FBQVE-01",
        "current_temp": "280",
        "list_usage":
            { "title": "Incineration!",
                "Type": "Sharps and needles.",
                "started": "2015-05-22T14:56:29.000Z", "ended":
"2015-05-22T14:56:28.000Z" },......
```

This JSON response, which was generated by the heating device, could then be made available to an application running on the mobile computing device or any other device that has been authenticated or permitted to connect to the port associated with the heating device.

This level of abstraction converts the heating device into a JavaScript IoT device and permits the interaction of setting and getting values from the heating device. On the contrary, a set process, would require, at 200, the use of a POST command and send a JSON object value to the proper set_*( ) parameter. As an example, assume that the solenoid status in the heating device needs to be released. Then a command could be issued with the JSON notation shown in the following TABLE 2.

TABLE 2

```
HTTP/1.1 200 OK
Content-Type: application/vnd.api+json
\{ "data": [
    { "id": "$FBQVE-01",
        "solenoid_status": "OFF" }
    ]
}
```

Figure 3:
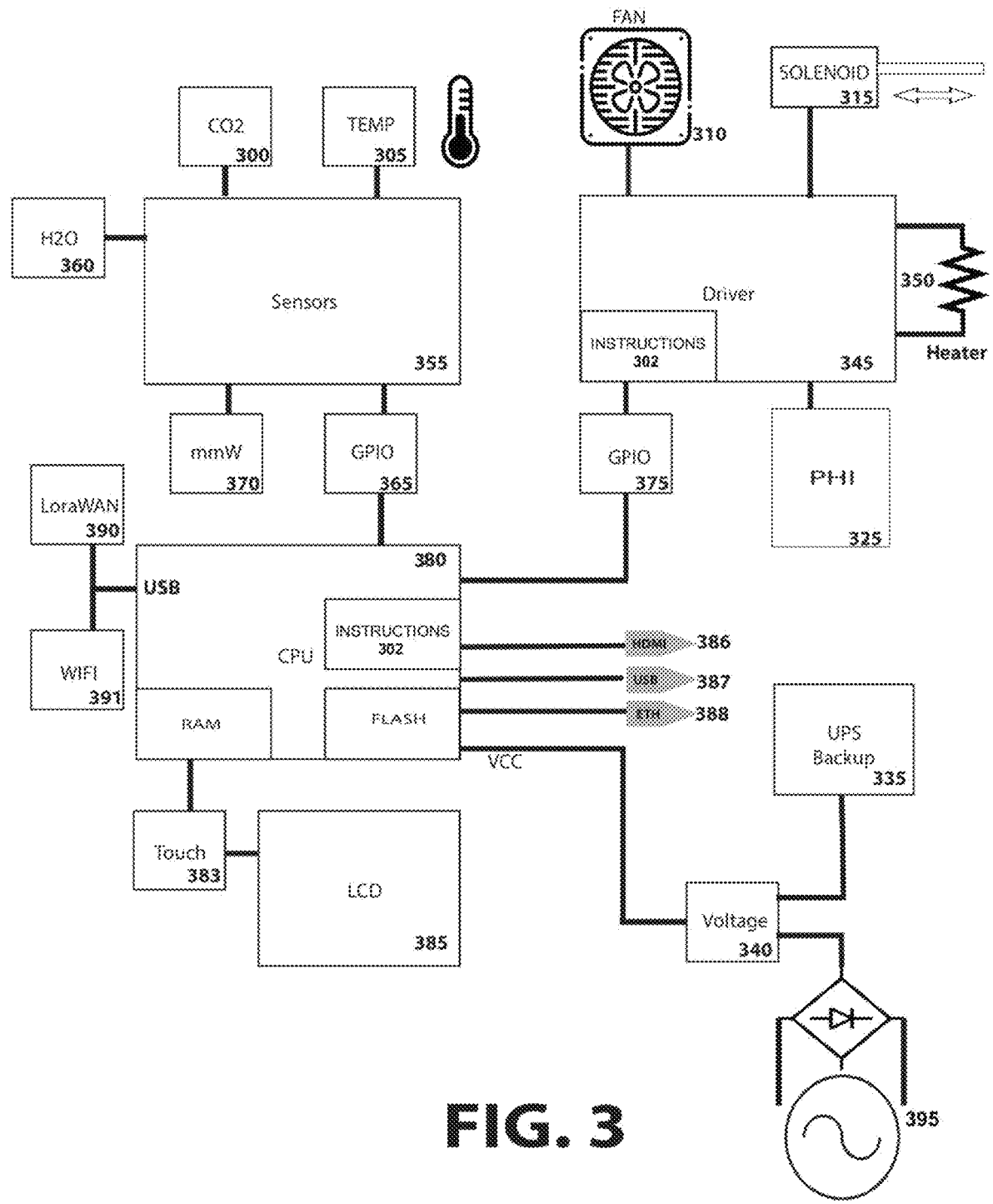
FIG. 3 provides a diagram of an illustrative computer architecture for an apparatus with sensors and drivers used for biohazard disposal processes.

As expected, a POST request will be made to server.domain.com/set_solenoid, at the receiving end a Python-based, or any other web-service, will receive the command from the tunnel and set the value of the parameter solenoid_status to "OFF." Likewise, a set of instructions may be performed by the heating device and use General Purpose Input/Output ("GPIO") pins in the local CPU (as shown in FIG. 3) to set and control not only a solenoid, but heating temperatures and device configurations, such as timers, utilization, passwords, and/or others.

By implementing the structure of FIG. 2A, any JSON-based IoT framework (e.g. NODERED) can be tied as a JSON sequence, especially if a software module is created for the heating element or incinerator, as depicted in 240.

As shown in FIG. 2A, a "Node-RED" sequence can be implemented, as in the sequence presented in 240, and the "Identifier Value" or "id" is validated in 245. It is noted, however, that according to various scenarios, other programmed sequencing tools may additionally, or alternatively, be used. If the identified or "id" is valid then a UI is loaded and presented in the device's screen 246. The "isValid( )" 245 command is used in the pseudo-code 248 indicating that the cloud's ID value stored in the structure "cloud.demolizer.id" is located in the global database. The UI may be locally displayed on the device's screen, if the ID is valid, or may display an "Error" message if not.

In the pseudocode, in 248, the function "display_UI( . . . )" is used by the function or command "LoadUI( )", at 246. The code that is part of the "LoudUI( )" function will return a full web page encoded in HTML, CSS, or Javascript, and/or any other plug-in format used in web browser.

As shown in this example, the UI may include an HTML page that is loaded as part of an HTTP request made to a local TCP/IP port in the localhost that could be mapped or stored in the cloud, if a tunnel points 215 to the cloud 210 or locally on device 250. An HTTP GET request will go the "url" variable which is a string to map to the command in use with a parameter "id" or any other sequence of parameters that could have recently used.

The command that is shown in 250 is: "Load(localhost, port).get("url"+id)", which is translated to retrieve from the localhost or at the IP address 127.0.0.1 and port. Once the UI is loaded and passed to the web viewer 250, the UI is created and displayed on a touch screen and waits in a loop for commands to be received via the display interface. The same loop can be used for an AR Interface or any other interface associated with the device control.

In summary, all entry points to control a device are REST endpoints controlled via HTTP GET/POST requests. These commands or entry points can be controlled locally in the local LAN network, by touch commands in the LCD screen, or remotely from another device by using the IP Tunnel 215 that was established initially when the device initially started.

This system and architecture permits the use of docker containers that encapsulates logic, HTML, and programming commands. The use of containers with HTTP entry points, sequence logic, and user interfaces are stored in containers that could be updated and maintained. As an example, a docker container or a Virtual Machine ("VM") (e.g., VmWare or Citix XenServer) as each container will have a separate IP address with multiple ports available to request information or command to the HTTP port and "url" values that map each entry point to retrieve functions or properties.

Another benefit of this architecture in combination with an IOT frameworks (as an example NODE-RED) that use JSON and HTTP interfaces to exchange property values that can be chained together is that the abstraction of objects can be combined with many other pre-defined modules or components in the NODE-RED interface, or any other similar interface in which the JSON elements can be retrieved, decoded, converted, and manipulated thru the same type of interface.

As shown in sequence 254, a temperature connector mapped to a temperature sensor can be used to determine if the device is within a range of room temperatures (e.g., 60-80° F.). If so, then a door latch is unlocked in 258 by using a solenoid. If the temperature is higher than 80° F., then the door latch will have to remain locked as shown by 259 as the heating chamber is not at a safe temperature to be opened. Similarly, if the amount of $CO_2$ detected by the $CO_2$ sensor is lower than a threshold (e.g., a safe level) in 261, then a decision needs to be made to stop the melting or burning process and set an alarm. The alarm can cause an email, a notification, or a message to be provided to an operator and/or a system administration. Once this alarm is set or the notification is received, a "Stop all" state or command is issued as shown by 264. If that is not the case, the system would continue normal operations as shown by 265.

In order to avoid a dangerous overflow of the water container, a water sensor measures the amount of water in 266. An alert is provided to the administrator if the water level is greater than a threshold as shown by 267. A high water level requires a manual replacement of a water receptacle tied to the condenser mechanism of the incinerator/heater or another sensor to return the water level to a normal or safe level. When the water level is not at a normal or safe level, an error value is presented in 269. When the water level is returned to a normal or safe level, the system continues with normal operation as shown by 270.

Any heating or incineration process would also require temperature control. In 271, a value of the thermostat sampled from the heater device is retrieved at 271. Fans are turned On or Off based on the retrieved value. When the fans are Off as shown by 275, heating is accelerated and the temperature raises. Once the temperature starts decreasing, the fans are turned On in 274 to accelerate a cooling process.

The mmW sensor 280 determines the amount of hazardous materials stored in the crucible of any particular enclosure. There are multiple ways that mmW systems can compute the amount of items stored in a particular area. Due to its high frequency and sealed nature of the crucible, mmW based techniques can be used to see-thru the metallic sheets and crucible. The mmW sensor may be positioned inside the crucible and/or in any other location with a protective shield for head dissipation. Measurements could be processed at the local CPU as in the configuration as shown in FIG. 3 and/or processed in the cloud by a Digital Signal Processing ("DSP") unit or Graphical Processing Units ("GPUs") that is able to process the mmW signals received by the mmW sensor. Hence, the function of the load at 281 will be able to determine the contents inside the crucible or the container (e.g., needles, materials, and/or any other biohazard material that is detected by this container area).

Finally another parameter that can be measured is power (e.g., as shown in 290, the value of Alternating Current ("AC") or Direct Current ("DC") power that connects with the CPU in FIG. 3). If wall_off means that there is no power from the wall or the AC source, then a Universal Power Supply ("UPS") is turned on, while saving a state of the current process.

This type of configuration permits the chaining and use of other tools that are already designed for web and IoT systems (including, but not limited to, NODE-RED as well as many others). For example, an mmW sequence 280 output "start_heater" 285 may be combined with "temp" or chained with other standard NODE-RED or any other set of commands that will automate the process, manage monitoring better, create authentication sequences, or use Machine Learning ("ML") to deliver an improved user experience and create multiple scenario for the software to control the system.

The sequences of elements are then capable of connecting to other "NODE RED" components (e.g., twitter, Facebook, social media, or other tools such as "slack" or any other system where a JSON feed could be consumed). JSON notation is used here. However, the present solution is not limited in this regard. In other scenarios, other formats are used such as blockchain, XML or Data-Definition Language ("DDL").

In FIG. 3, an illustration of an illustrative hardware architecture for the hearing device is provided which implements all or a portion of the software described herein in relation to FIG. 2. As shown, the hardware includes a CPU 380 with Random Access Memory ("RAM") and Flash memory. The CPU interfaces with touch screen technology 385. The GPIO unit 365 interfaces with a driver unit 373 that handles the UPS and/or backup power unit 335 that is also connected with the AC voltage source 395. The voltage 340 is connected to the CPU 380 and is monitored by the CPU. Once the voltage fails, the sequence of 290 is activated. At the same time, the CPU unit provides HDMI 386, USB 387, and Ethernet 388 outputs. Another GPIO unit may handle the sensors 355 for mmW 370, $H_2O$ 360, $CO_2$ sensors 300 and temperature 305. The sensor board 355 is captured by a GPIO 365 board that feeds the CPU 380. Other interfaces may include LORAWAN 390, WiFi 391, and/or Bluetooth that provide local connectivity to mobile communication devices, or use LORAWAN 390 and establish an IoT network to control, manage, and/or report all crucible use and heating and/or melting processes.

The sensors in the GPIO 365 signals are mapped to the mmW sequence in 280, temperature sequence 281, $H_2O$ in 266 and temperature 254.

The heater 350 is controlled via the command "start_heater" 285. Notably, other suitable commands may also, or alternatively, be used. The heater 350, fan 310, solenoid 315 and Photo Hydro Ionization ("PHI") cell 325 may be controlled, using a driver 345, using software or commands to set values or other elements via the commands sent through the IP Tunnels. In general, most sensors shown in FIG. 3 are binary ON/OFF, or a range of values (e.g., 0-255).

The activated elements are used during the entire heating process, and involve the components such as the fans 274-275, heaters 285 and solenoid 258-259 (which are required for a heating element). One such design may include a "start_heater" process, turning on a heater 285, and continues with 256 and when the temperature sensor 305 starts increasing until a certain value, or before hitting that value, or by using a PID controller to reach 300-400 F of temperature inside the crucible and hold this temperature for a period of time, and maintain the solenoid in a "locked" state, while the system of FIGS. 2A-2B uses HTML/CSS and JavaScript messages (e.g., Ajax, Asynchronous requests, or other by-directional connectors such as websockets). The locked stated may be achieved by applying power to the solenoid component that is magnetized and closes a protective latch.

Figure 4:
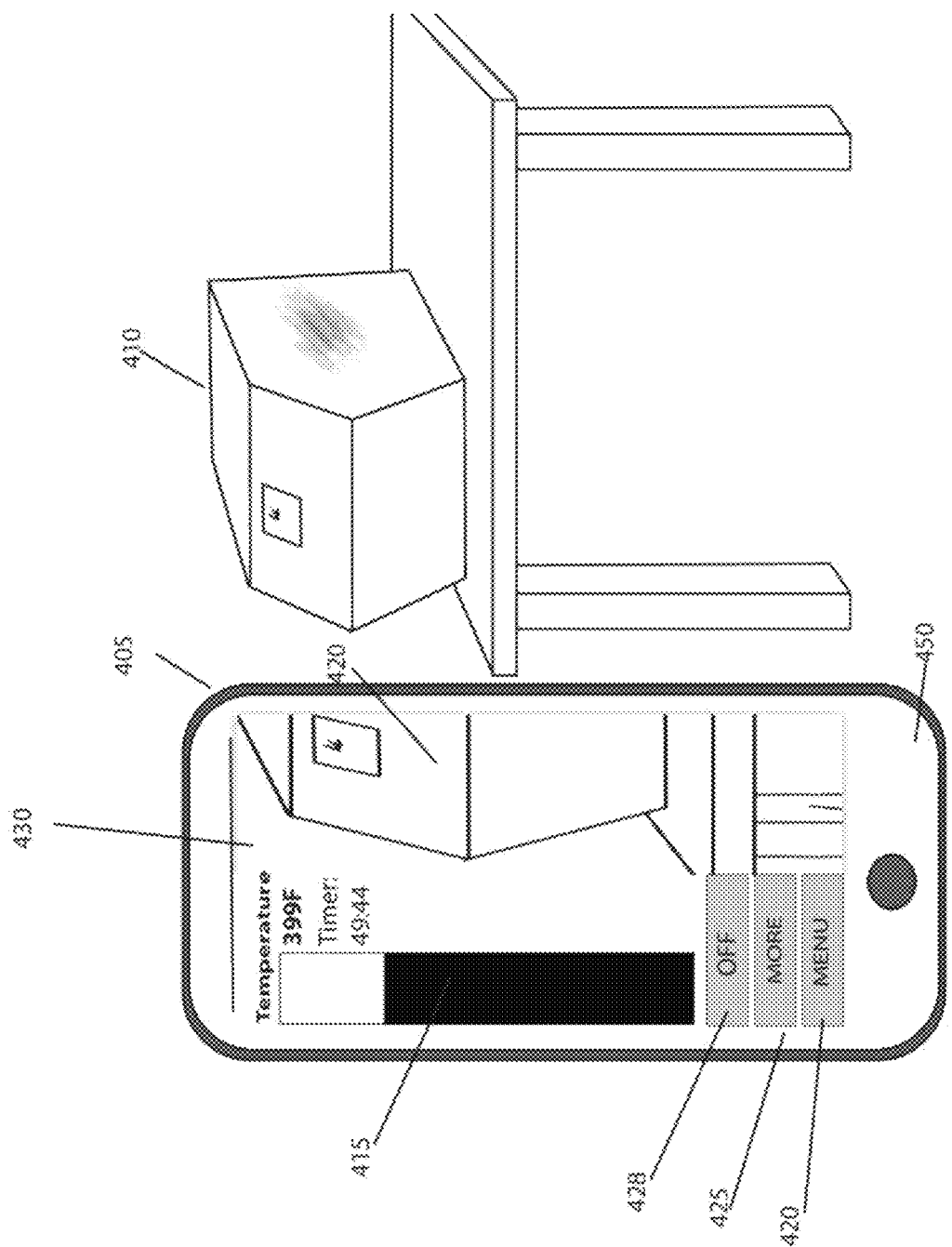
FIG. 4 shows an illustrative mobile user interface to control biohazard processes using augmented reality.

In FIG. 4, the components and software shown in FIGS. 2 and 3 are stored and are part of heating device 410. These components activate a heater to raise the temperature of the crucible inside of the heating device 410. A mobile communication device is provided with a camera 405 which can be pointed to the heating device 410 as shown in FIG. 4. The mobile communication device overlays, using an AR kit and/or any other augmented reality feature, the temperature values 430 which may also be mapped to a raising bar with the amount of temperature inside the crucible, as well as display the image of 410, represented in 420, that is detected by the use of a target item, Bluetooth, and/or any contextual information derived from the video being shot with the mobile phone's camera. This enables the mobile communication device to use the GUI, AR UI, and/or any other suitable UI to display a computer-generated image of the heating device 410 to be superimposed on the user's view of a real world environment and/or AR environment.

Additionally, the mobile communication device can be configured to overlay a menu with commands such as "off" 420 that will turn off the heating device 410 in case of any situation, "more information" 425 that will enable additional overlay data that may include example $CO_2$ or $H_2O$ levels that are captured in the architecture and software shown in FIG. 2. According to some scenarios, the menu is an AR menu. The menu 428 may include additional commands or configuration parameters that may load AR or native user interfaces to control or configure the melting/incinerator unit. Additionally, a timer with the amount of time that is remaining to complete the melting or incineration process could be displayed 420. The mobile application could be connected directly to the unit using an IP Tunnel to the cloud 210 or in some instances could connect to the unit directly. A discovery method could be implemented using any service discovery protocol such as Universal Plug and Play ("UPnP"), DLNA, or Bonjour, which can be implemented with the augmented reality application and connect directly to the URLs exposed by 230. In summary, the application shown in FIG. 4 can retrieve and map the values in FIG. 3, list usage of the application, or even activate/deactivate the solenoid holding door locked, or by receiving $CO_2$ values from the architecture shown in FIG. 2 as a software abstraction of FIG. 3.

Figure 5A:
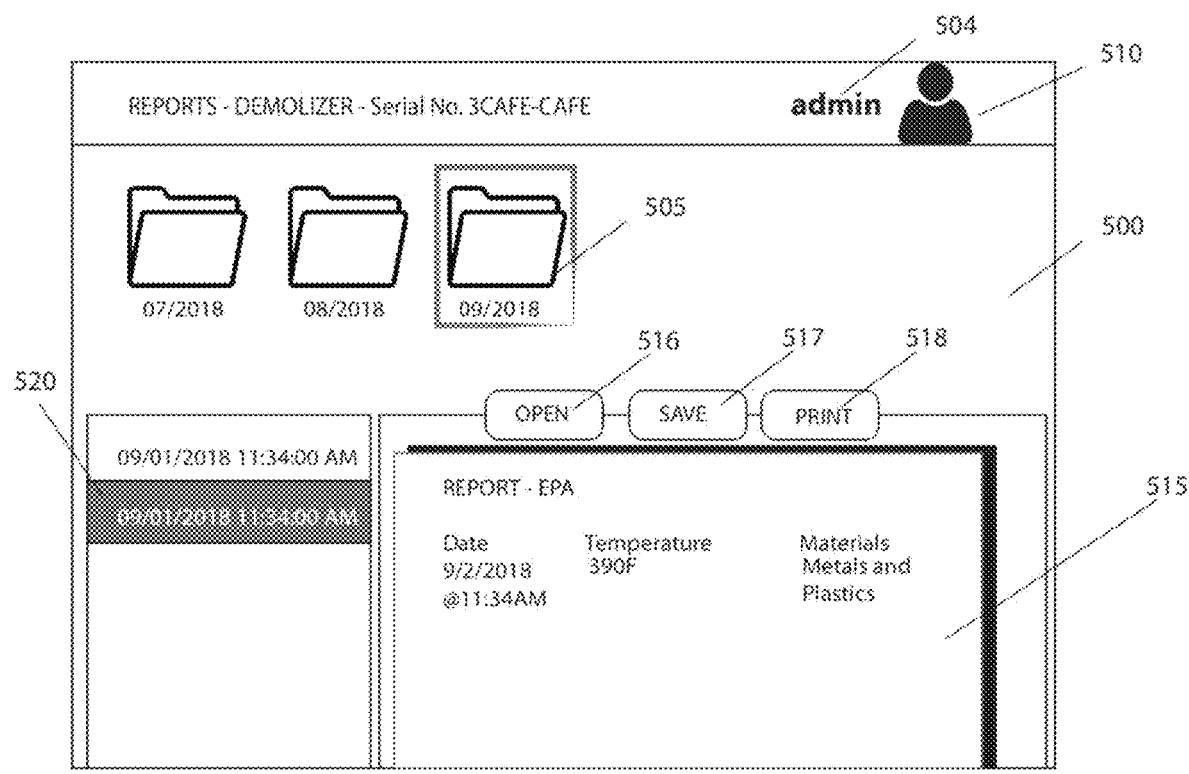
FIG. 5A shows an illustrative graphical user interface with usage reporting with a PDF Viewer.
Figure 5B:
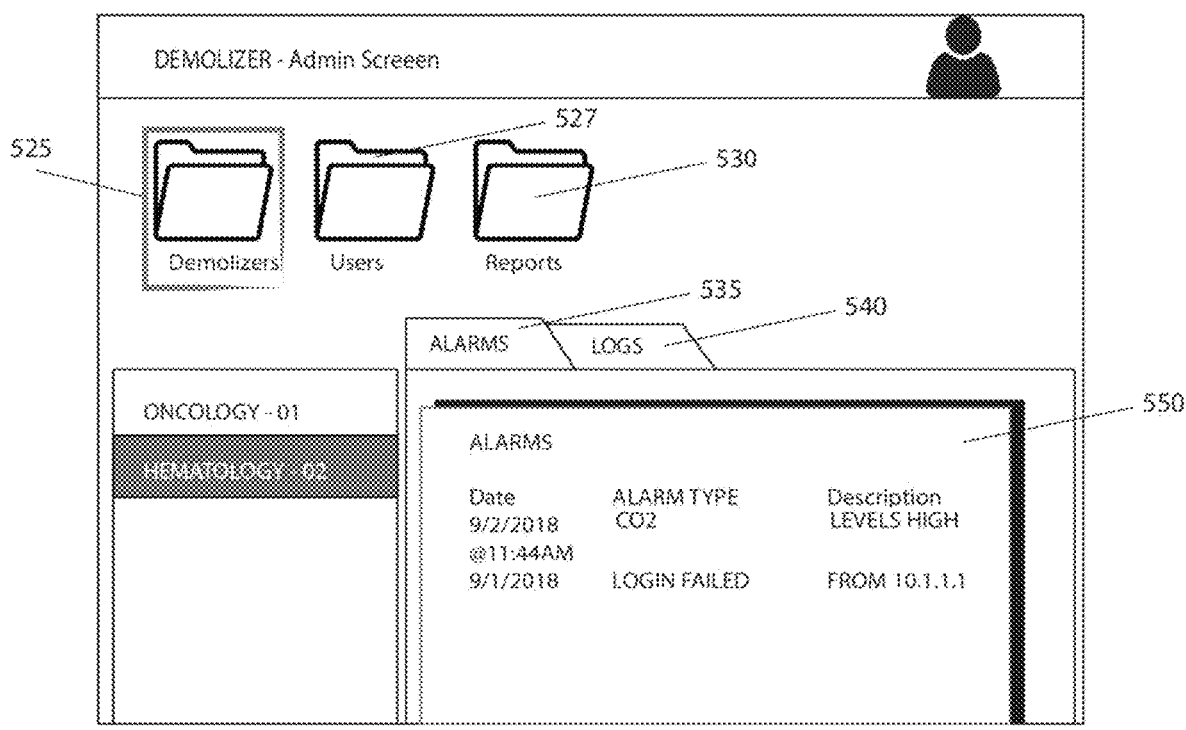
FIG. 5B shows an illustrative graphical user interface with administration, logs, and a user management screen.

Once all of these operations are related to the unit that heats, melts, or incinerates materials, FIGS. 5A-5B (collectively referred to herein as "FIG. 5") illustrate the UI that collects reporting information and displays access to the authentication process, and/or displays other mechanisms that are connected to the cloud shown in 210. In 500, the UI could be a binary or an HTML page that displays, in multiple folders 505, a picture of the administrator 510 indicating which melting or heating device is in use 504. A list of reports and usage information is shown in 520 for purposes of managing the reports for EPA or other environmental agency proof of destruction of hazardous materials. The reports can be "Open," 516 "Saved," 517 or "Printed" 518, and the report may include timestamps of melting, temperature, and any other suitable information (e.g., in PDF format 515 or any other web-based printable format that can include a digital signature for validation purposes).

An administration page for the heating devices may be constructed, as shown in FIG. 5B, where information for the heating devices 525 is stored and maintained, exposing all the values shown in FIG. 2B. Additionally, alarms and logs may be stored, and devices displayed, at the user level. Users 527 may be managed as well as granted access to the reports 530.

Figure 6:
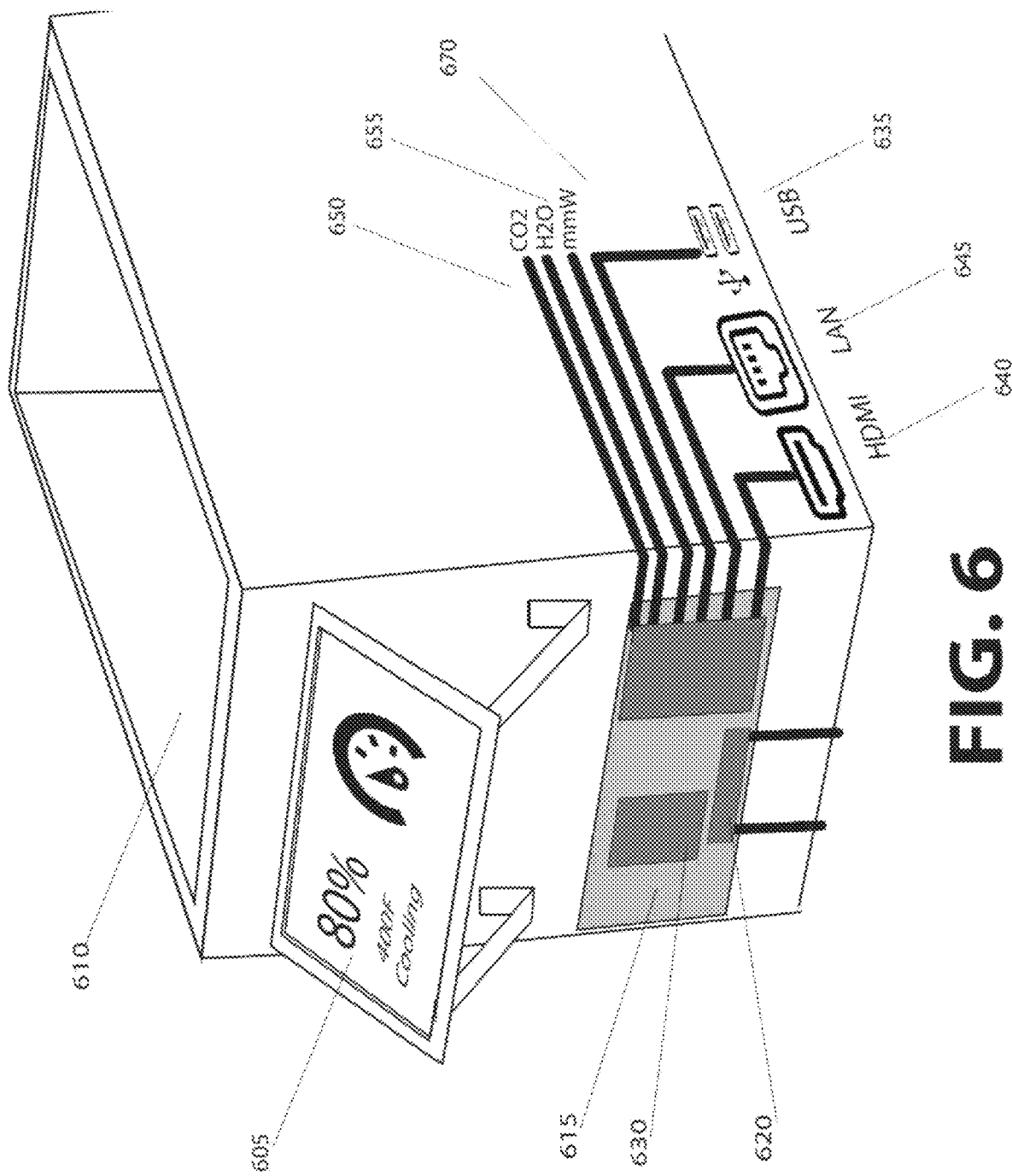
FIG. 6 provides an illustration of a computing device and touch screen mounted in an apparatus with a crucible.

FIG. 6 illustrates how the elements in FIG. 3 are assembled around a crucible unit structure. The crucible is depicted in 610 and a touch interface in 605, which displays temperature and a progress timer. The computing unit from FIG. 3 is mounted in the board shown in 615 and the CPU displayed on 630. In 620, the sensors or GPIO board connect to the $CO_2$ sensor in 650, the mmW sensors in 655 and the $H_2O$ sensor in 670. Additionally, wiring is connected to the heater unit that is connected with the inside crucible that starts the heating process as well as the solenoid for locking/unlocking an external door that covers the crucible section 610. Also depicted in this unit are the USB 635 port, HDMI output 640 and Ethernet port 645.

Figure 7A:
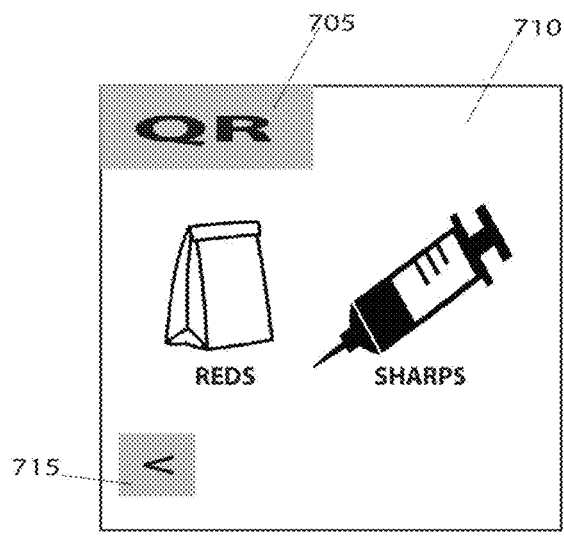
FIGS. 7A-7D (collectively referred to herein as "FIG. 7") provide illustrations of touch-screen and user interfaces for initiation and monitoring biohazard waste destruction processes.
Figure 7B:
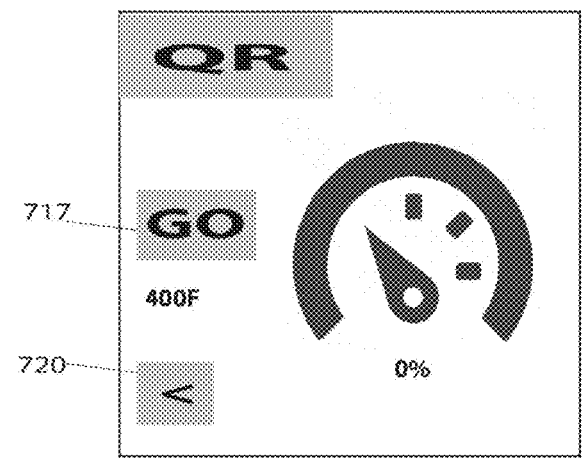
Figure 7C:
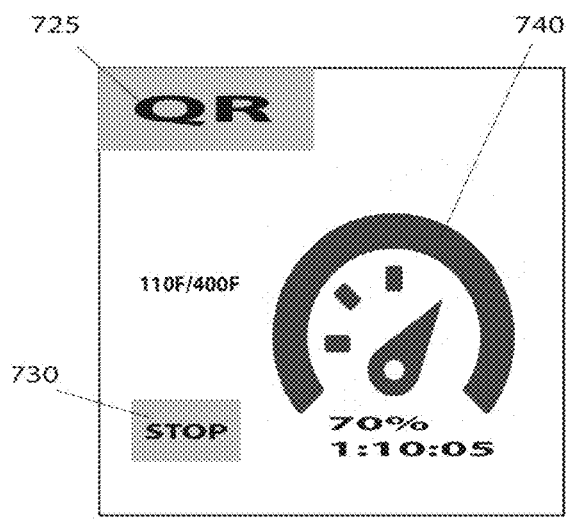
Figure 7D:
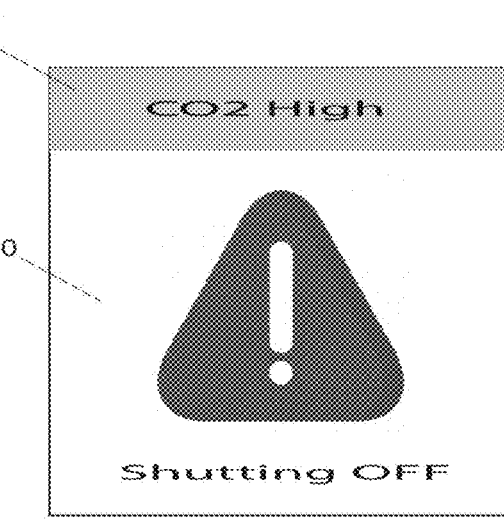

The touch screen displays UIs and icons that are used to heat and destroy several types of materials, for instance "red bags" or "needles", as shown in FIG. 7A, with a QR code menu 705 or 725. The QR code displays a QR code that maps the heating device to the command/control application with AR or non-AR controller applications. Once the biohazard material is chosen, a screen shown in FIG. 7B is loaded from the system via an html-based UI or a combination of HTML/Native elements are displayed. The proper temperature and configuration values are downloaded from the cloud and proper selection into the heating device and a start 717 button is displayed, as shown in FIG. 7B. Once the start button is selected, a screen is created, as illustrated in FIG. 7C with a progress bar indicating how much time is left to complete the melting and/or heating process 740. This may be a touch-based interface with a web-based user interface constructed using HTML/CSS/JavaScript/etc. This interface, shown in FIG. 7D, may also include a progress bar 740, a stop button 730, and/or even a warning screen with messages such as those shown as 745 and 750, in case of an emergency to alert the user about a sudden shutdown given an alarm or dangerous situation.

Figure 8:
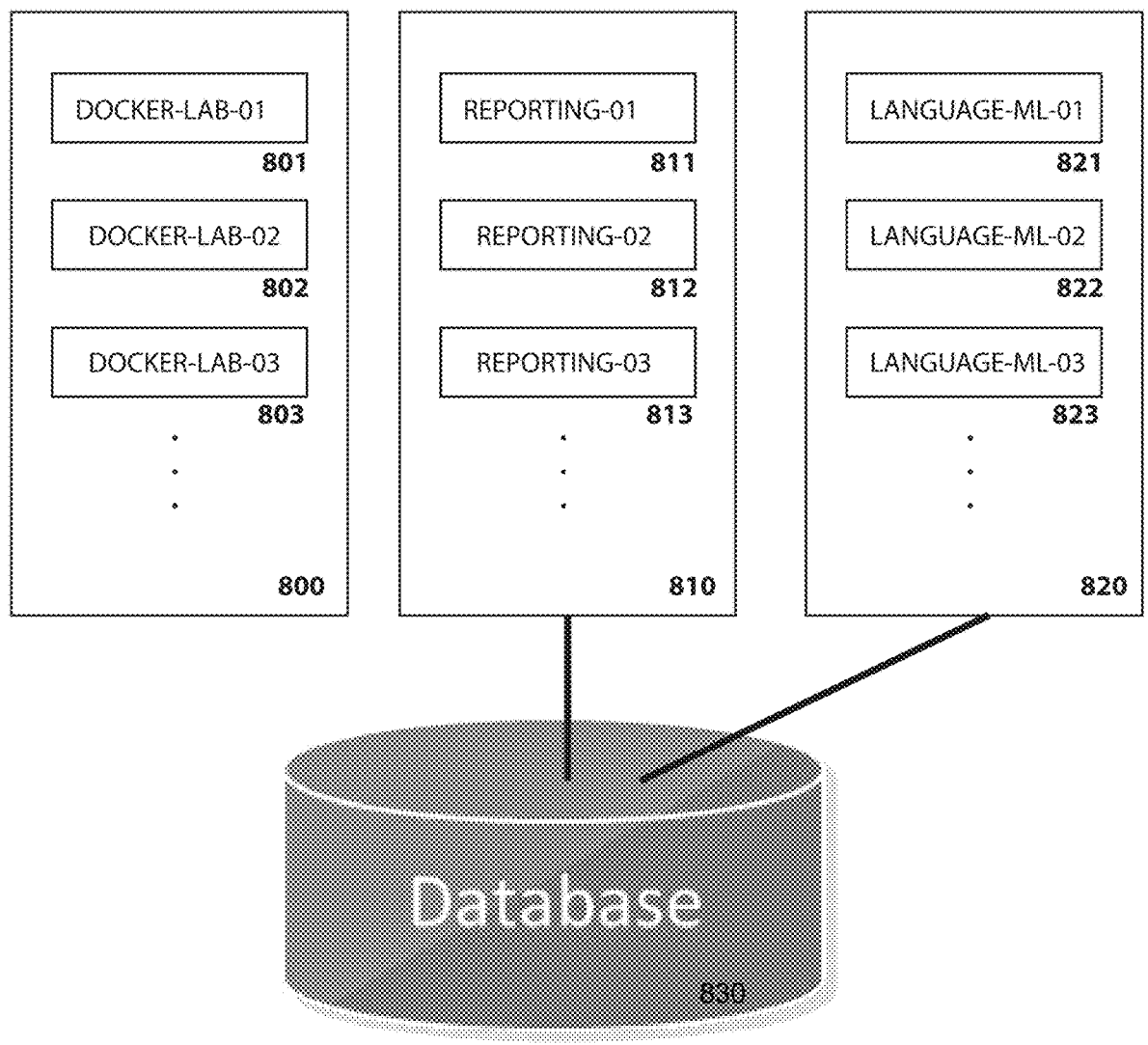
FIG. 8 provides an illustration of an illustrative system including containers, reporting databases, and logic/rules databases.

The components shown in FIG. 2 and the UIs in FIGS. 7A-7B (collectively referred to herein as "FIG. 7") and FIG. 5 are stored in docker containers and/or any other type of VM where all web pages are stored, including reporting and a logging database. As shown in FIG. 8, a set of containers is stored in a standard file system 800 with a docker image per laboratory or configuration used for melting or incinerating devices. Each docker image is then loaded in the heating device's CPU and memory 380 (FIG. 3), and each image stores the user interface, resources, images, widgets, as well as temperature values and other calibration values stored in a per docker image 801-803. All reporting may also be stored in tables that map each reporting 811-813 that is stored in a database 830 with all of the behavior that is being reported from the docker images and machines executing at each remote melting station. The component called "Language/ON-RED TOT" 820 stores the sequences of commands that execute the elements of FIG. 2 in sequences that may not only perform monitoring, control, and management functions per image performed, but may also include "Machine Learning" information that is being captured from multiple heating devices.

Figure 9A:
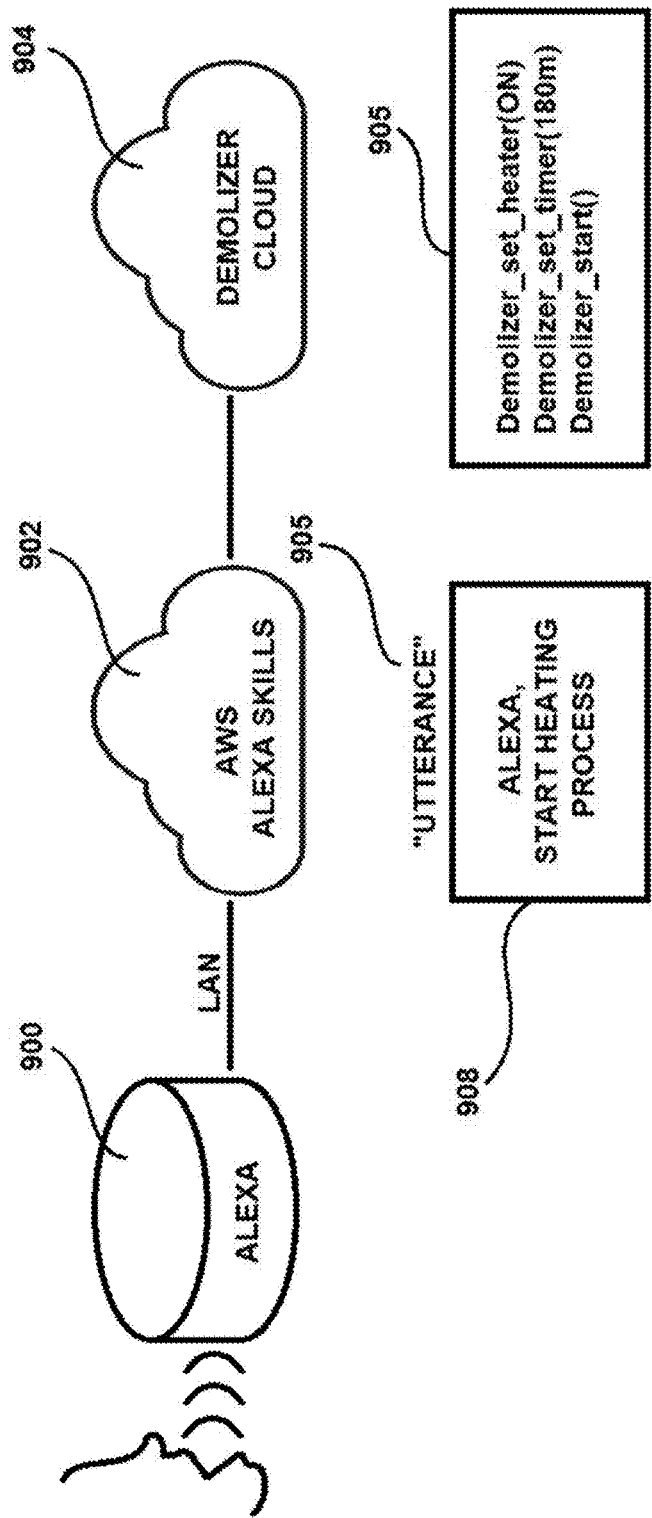
FIGS. 9A-9B (collectively referred to herein as "FIG. 9") provides an illustration that is useful for understanding a voice controlled interface for controlling biohazard melting processes.

FIG. 9A illustratively depicts a system and architecture configured to perform voice-operated heating processes.

As shown, Alexa is used as an example, though any suitable voice-recognition software may be used 900 through the local network (e.g. LAN), and the Amazon Web Service ("AWS") 902 cloud is contacted, where utterances are stored and the cloud 904 is contacted. The utterances 908 (e.g., "Alexa, started heating process") is sent to the DDL system in the cloud 905 mapping an HTTP Request to the domain and port that maps the desired heating device. The heating process is then initiated and maintained for a set length of time (e.g., "180 minutes") and the process starts. The intelligence loaded with language 820 interacts in parallel to the commands received via voice.

Figure 9B:
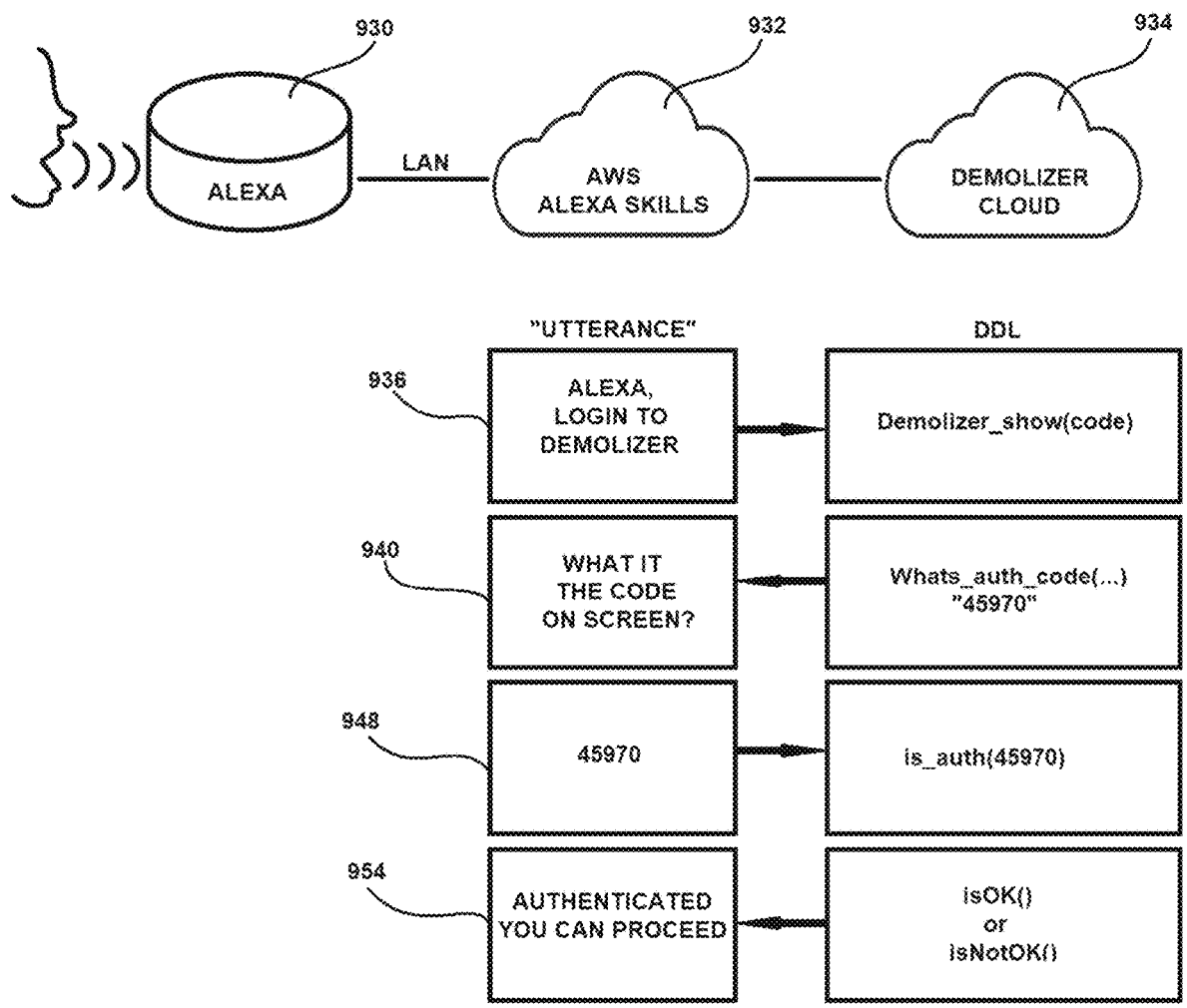

In FIG. 9B, the utterances are received by Alexa 930 and processed in AWS as an "Alexa skill" 932 and connects with the cloud of heating and/or melting devices 934 depicted in FIG. 2. The system is configured to recognize one or more voice commands. A set of utterances may include authentication 936 when a code is "played" back to Alexa, requesting input of the code "What is the code on screen?" 940, which code could be displayed on the screen of the device. In this case, the code is "45970" as in 948 and once it is recognized or authenticated by the system 950. Once authenticated by the device by matching the code with the displayed value 954, a variable (e.g., "isOK( )" or "isNotOK( )") may be used in all other voice commands and interactions 954.

Figure 11:
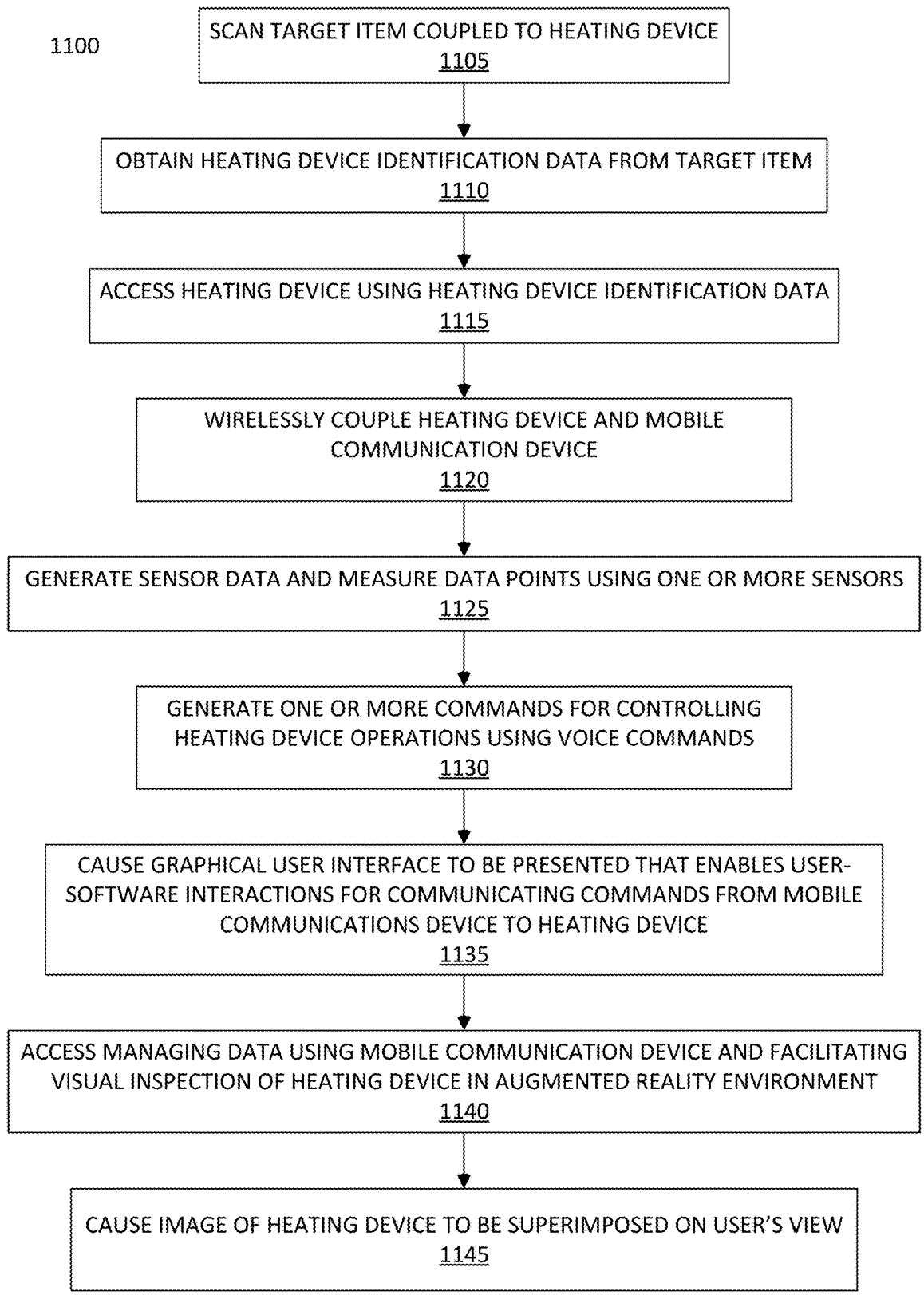
FIG. 11 provides a flowchart illustrating a method of controlling a heating device using a mobile communication device.

Referring now to FIG. 11, there is provided a flow diagram of an illustrative method 1100 for controlling a heating device using a mobile communication device. The heating device may include, but is not limited to, an incineration device or a melting device.

At 1105, using a camera coupled to a mobile electronic device, a target item coupled to a heating device is scanned. The heating device may include a transceiver that receives commands for controlling operations of the heating device to dispose of biohazard waste, and a target item that is coupled to or presented by the heating device, and includes heating device identification data. The target item may include a Radio Frequency tag and/or any other suitable form of identification media. The operations of the heating device may include powering on the heating device, powering off the heating device, altering a temperature of the heating device, setting a timer for a function of the heating device, and/or any other suitable operations of the heating device.

Once the target item is scanned, the heating device identification data, at 1110, is obtained. The heating device identification data may be obtained using a mobile communication device, which includes a circuit. Using the heating device identification data, at 1115, the heating device is accessed and, at 1120, the heating device and the mobile communication device are wirelessly coupled, via a cloud network. The coupling may include inputting one or more login credentials.

The heating device may include at least one sensor. At 1125, using the at least one sensor, one or more measurements are taken and/or generated. The at least one sensor may measure an internal temperature of the heating device, a temperature of a biohazard waste material within the heating device, a weight of a biohazard waste material within the heating device, a volume of a biohazard waste material within the heating device, a level of carbon dioxide within the heating device, a level of water within the heating device, an amount of time since a start of a heating process being performed by the heating device, and/or any other suitable measurements. The at least one sensor may further generate sensor data that is useful for identifying at least one biohazard waste material within the heating device.

The mobile communications device may include a microphone. At 1130, the mobile communication device generates one or more commands for controlling operations of the heating device in accordance with one or more voice commands input using the microphone.

Once the heating device and the mobile communications device are coupled, at 1120, a graphical user interface, at 1135, is caused to be presented that enables one or more user-software interactions for communicating the commands from the mobile communication device to the heating device. The mobile communication device can further be used, at 1140, for accessing management data generating by the at least one sensor of the heating device, and for facilitating a visual inspection of the heating device in an augmented reality environment. In correlation with the augmented reality environment, at 1145, a computer-generated image can be caused to be superimposed on the user's view of a real world environment.

While certain embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the present disclosure.

What is claimed is:

1. A biohazard waste disposal system, comprising:
   a heating device comprising:
      a transceiver comprising a virtual machine configured to receive instructions that control operations of the heating device to dispose of biohazard waste contained in the heating device; and
      a target item that is coupled to or presented by the heating device, and includes heating device identification data; and
      a mobile communication device communicatively coupled to the virtual machine and comprising a circuit configured to:
         obtain the heating device identification data from the target item;
         access the heating device using the heating device identification data; and
         cause an augmented reality user interface to be presented that enables user-software interactions for communicating the commands from the mobile communication device to the heating device directly using an Internet Protocol Tunnel.

2. The system according to claim 1, wherein the mobile communications device is further configured to cause a computer-generated image of the heating device to be superimposed on a user's view of an augmented realty environment.

3. The system according to claim 1, wherein the target item comprises a barcode or a Radio Frequency tag.

4. The system according to claim 1, wherein the heating device further comprises at least one sensor configured to measure at least one of:
   an internal temperature of the heating device;
   a temperature of a biohazard waste material within the heating device;
   a weight of a biohazard waste material within the heating device;
   a volume of a biohazard waste material within the heating device;
   a level of carbon dioxide within the heating device;
   a level of water within the heating device; and
   an amount of time since a start of a heating process being performed by the heating device.

5. The system according to claim 1, wherein a plurality of sensors are configured to generate sensor data for identifying at least one biohazard waste material within the heating device.

6. The system according to claim 1, wherein the mobile communication device further comprises a microphone, and the processor is further configured to generate commands for controlling operations of the heating device in accordance with voice commands input using the microphone.

7. The system according to claim 1, wherein the heating device comprises a Photo Hydro Ionization ("PHI") cell.

8. The system according to claim 1, wherein the operations of the heating device comprise at least one of powering on the heating device, powering off the heating device, altering a temperature of the heating device, and setting a timer for a function of the heating device.

9. The system according to claim 1, wherein the mobile communication device accesses measurement data generated by one or more sensors of the heating device, and facilitates a visual inspection of the heating device in an augmented reality environment.

10. The system according to claim 1, wherein the heating device and the mobile communication device are wirelessly coupled via a cloud network.

11. A method, comprising:
   scanning, using a camera on a mobile communications device remote to a heating device, wherein the heating device loads a virtual machine and comprises:
      a transceiver that receives commands through the virtual machine with instructions for controlling operations of the heating device to dispose of biohazard waste; and
      a target item that is coupled to or presented by the heating device, and includes heating device identification data;

obtaining, using a mobile communication device remote to the heating device including a circuit, the heating device identification data from the target item;

accessing the heating device using the heating device identification data; and causing a graphical user interface to be presented that enables user-software interactions for communicating the commands from the mobile communication device to the heating device using an Internet Protocol Tunnel.

12. The method as recited in claim 11, further comprising:
causing a computer-generated image of the heating device to be superimposed on a user's view of a real-world environment.

13. The method as recited in claim 11, wherein the target item comprises a barcode or a Radio Frequency tag.

14. The method as recited in claim 11, wherein the heating device further comprises at least one sensor, and further comprising:

taking one or more measurements using the at least one sensor; and measuring, using the at least one sensor, at least one of:
an internal temperature of the heating device;
a temperature of a biohazard waste material within the heating device;
a weight of a biohazard waste material within the heating device;
a volume of a biohazard waste material within the heating device;
a level of carbon dioxide within the heating device;
a level of water within the heating device; and
an amount of time since a start of a heating process being performed by the heating device.

15. The method as recited in claim 11, further comprising generating sensor data, using a plurality of sensors for identifying at least one biohazard waste material within the heating device.

16. The method as recited in claim 11, wherein the mobile communication device further comprises a microphone, and further comprising:

generating commands for controlling operations of the heating device in accordance with voice commands input using the microphone.

17. The method as recited in claim 11, wherein the heating device comprises an incineration device or a melting device.

18. The method as recited in claim 11, wherein the operations of the heating device comprise at least one of powering on the heating device, powering off the heating device, altering a temperature of the heating device, and setting a timer for a function of the heating device.

19. The method as recited in claim 11, further comprising:
using the mobile communication device:
accessing management data generating by one or more sensors of the heating device; and
facilitating a visual inspection of the heating device in an augmented reality environment.

20. The method as recited in claim 11, further comprising:
wirelessly coupling the mobile communications device and the heating device via a discovery protocol,
wherein wirelessly coupling the heating device and the mobile communications device includes a secure key or certificate.

* * * * *